United States Patent [19]

Kodama et al.

[11] 4,297,691
[45] Oct. 27, 1981

[54] FIGURE DISPLAYING DEVICE

[75] Inventors: Kazuyuki Kodama, Kokubunji; Kunihiro Okada; Takeyuki Endoh, both of Hinode; Yasutaka Shibuya, Tachikawa, all of Japan

[73] Assignees: Hitachi, Ltd.; Hitachi Denshi Kabushiki Kaisha, both of Tokyo, Japan

[21] Appl. No.: 70,821

[22] Filed: Aug. 29, 1979

[30] Foreign Application Priority Data

Aug. 30, 1978 [JP] Japan .................... 53-104944

[51] Int. Cl.³ .......................... G06F 3/14; G09B 9/00
[52] U.S. Cl. .................... 340/723; 340/703; 340/728; 340/793; 358/104; 358/182; 434/41; 434/43; 364/900
[58] Field of Search ............... 340/701, 703, 729, 705, 340/793, 27 NA, 723, 728; 358/104, 182; 434/41, 42, 43; 364/900 MS File

[56] References Cited

U.S. PATENT DOCUMENTS

| 3,213,447 | 10/1965 | Burrows et al. | 340/729 |
|---|---|---|---|
| 3,441,789 | 4/1969 | Harrison | 340/729 |
| 3,515,802 | 6/1970 | Wise | 434/43 |
| 3,527,980 | 3/1970 | Robichaudet al. | 340/729 |
| 3,603,962 | 9/1971 | Lechner | 340/703 |
| 3,668,622 | 6/1972 | Gannett et al. | 340/729 |
| 3,778,811 | 12/1973 | Gicca et al. | 340/722 |
| 3,786,483 | 1/1974 | Sinobad | 340/701 |
| 3,845,243 | 10/1974 | Schmersal et al. | 340/793 |
| 3,886,403 | 5/1975 | Owaki et al. | 340/793 |
| 3,925,776 | 12/1975 | Swallow | 340/744 |
| 3,944,997 | 3/1976 | Swallow | 340/703 |
| 3,997,719 | 12/1976 | Judice | 340/793 |
| 3,999,308 | 12/1976 | Peters | 434/43 |
| 4,016,658 | 4/1977 | Porter et al. | 434/41 |
| 4,032,912 | 6/1977 | Wood | 340/722 |
| 4,189,743 | 2/1980 | Schure et al. | 340/701 |
| 4,199,875 | 4/1980 | Barbarasch | 434/43 |

OTHER PUBLICATIONS

"A Flat-Panel TV Display System in Monochrome and Color," Amano, IEEE vol. ED-22, No. 1, Jan. 1975, pp. 1-7.

Primary Examiner—Gareth D. Shaw
Assistant Examiner—Eddie P. Chan
Attorney, Agent, or Firm—Craig and Antonelli

[57] ABSTRACT

A figure displaying device for generating a brightness signal which corresponds to a figure information to be displayed as well as for generating a brightness modulation signal which varies within a predetermined first region on a display screen. The device also generates a frequency characteristic control signal which varies within a predetermined second region on the display screen. Furthermore, the display is able to subject the brightness signal to a brightness modulation in accordance with the signal from the modulator generator with the brightness signal being controlled by the frequency characteristics control signal. The resultant figure displayed on a monitor is based on a modulation signal obtained through the modulation generator and the frequency characteristics control generator.

4 Claims, 23 Drawing Figures

FIG. 10(a) HSYNC

FIGURE DISPLAYING DEVICE

BACKGROUND OF THE INVENTION

1. Field of the Invention

This invention relates to a figure displaying device such as the visual scene display of the CGI (computer generated image) type.

2. Description of the Prior Art

During training for the control of an airplane, etc., a visual scene display is used in order to simulate visual scenes which are seen out of the window of a cockpit while following the movement of the airplane or the like.

The visual scene display is such that edges representative of the contour of a figure to be displayed are generated on the basis of data which is transmitted from a computer which depends on the piloted status of the airplane or the like; these edges are converted into a surface, and the surface is displayed on a monitor device. With a prior-art display the brightnesses of the respective figures displayed are uniform, so that the picture tends to bring about visual fatigue and an inferior training effect.

SUMMARY OF THE INVENTION

An object of this invention is to provide a figure displaying device which can generate and display very real and natural pictures in accordance with various circumstances and visibilities.

When the visual scene is generated and displayed as stated above, it is necessary to generate and display on a monitor device figure which are as real as possible in order to avoid visual fatigue and enhance the training effect on a monitor device. To this end it becomes important to employ the so-called gradation with which a figure more distant from a visual point has a more blurred contour and to generate the peculiar visual scenes of a cloudless sky, a mist, nighttime, twilight etc.

In view of the foregoing, this invention provides a figure displaying device which generates a brightness signal corresponding to figure information to be displayed and controls the modulation and frequency characteristic of the brightness signal by the use of a brightness modulation signal and a frequency characteristic control signal respectively varying within a predetermined region.

BRIEF DESCRIPTION OF THE DRAWINGS

FIG. 5, including 5(a)–5(g), is a diagram showing examples of data which are written into RAMs in FIG. 3;

FIGS. 10(a)–10(f) is a diagram of signal waveforms in various parts in FIG. 9;

DETAILED DESCRIPTION OF THE PREFERRED EMBODIMENTS

Figure 1:
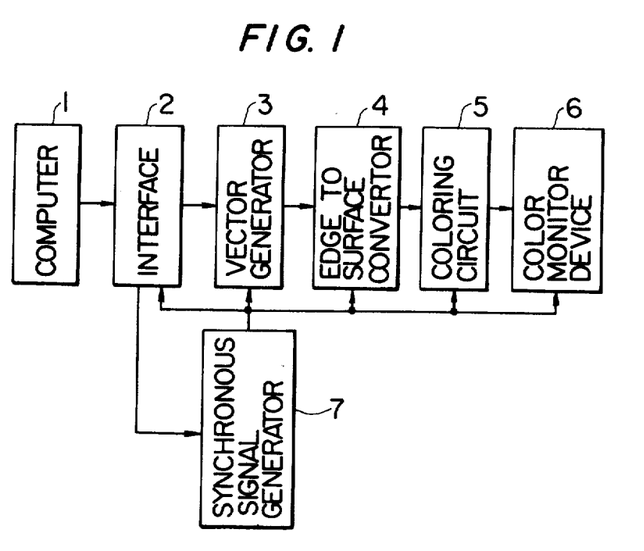
FIG. 1 is a fundamental block diagram of a visual scene display.

FIG. 1 shows the fundamental construction of a visual scene display system of the type specified previously. Numeral 1 designates a computer, numeral 2 an interface, numeral 3 a vector generator, numeral 4 an edge-to-surface converter, numeral 5 a coloring circuit, numeral 6 a color monitor device such as color cathode-ray tube, and numeral 7 a synchronizing signal generator.

In such construction, data which is transmitted from the computer 1 in accordance with a piloted state is put into the vector generator 3 through the interface 2. On the basis of the data, the vector generator 3 generates edges representative of the contour of a figure. The edge-to surface converter 4 converts the edges from the vector generator 3 into a surface and transmits the surface information to the coloring circuit 5. Here the surface information is converted into color information, which is displayed on the color monitor device 6. The operations of these circuits are controlled by synchronizing signals from the synchronizing signal generator 7.

Figure 2:
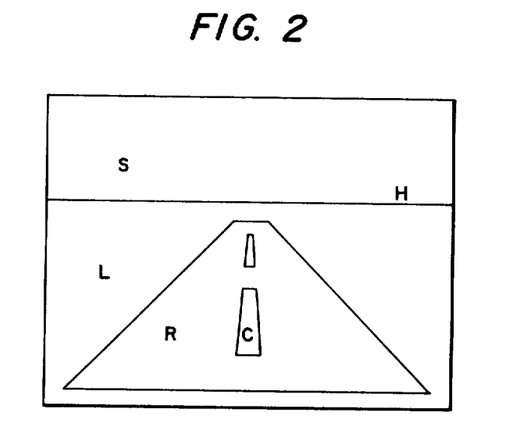
FIG. 2 is a diagram showing an example of a surface which is displayed.

Thus, a surface as shown in FIG. 2 can be indicated on the color monitor device 6. In the figure, letters S, L, R, C and H denote the sky, a lawn, a runway, a center line and the horizon.

Hereafter, embodiments of this invention will be described in detail with reference to the drawings.

Figure 3:
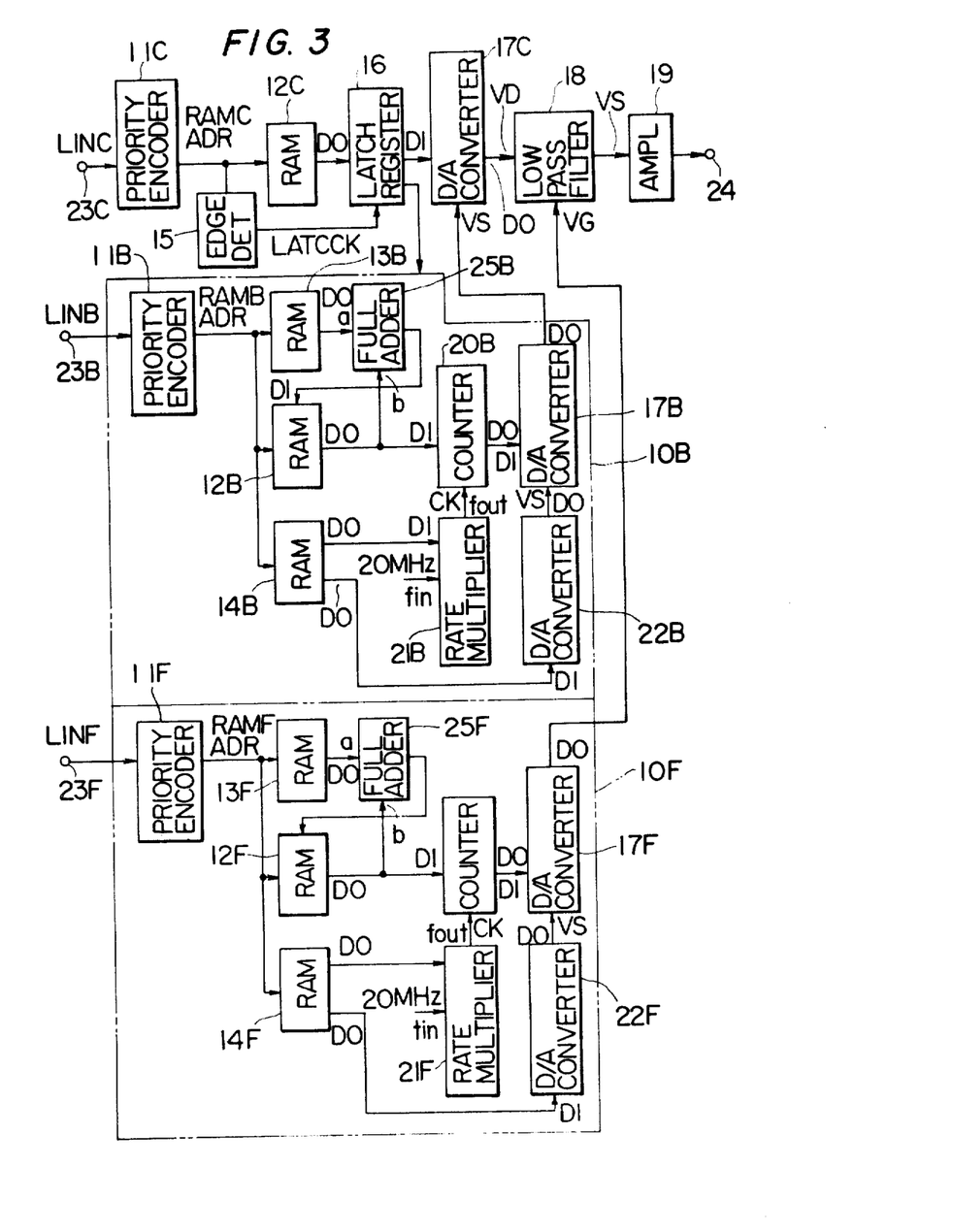
FIG. 3 is a schematic block diagram of an embodiment of a figure displaying device according to this invention.

FIG. 3 shows a schematic block diagram of an embodiment of the figure displaying device according to this invention, which corresponds to the coloring circuit in FIG. 1. Shown in FIG. 3 is only the circuit which corresponds to one of the three primary colors of red R, green G and blue B. Letters C, B and F affixed to various numerals represent references to the controls of the color information, brightness modulation and frequency characteristics, respectively.

Referring to FIG. 3, symbols 11C, 11B, and 11F designate priority encoders; symbols 12C, 12B, 12F, 13B, 13F, 14B and 14F random access memories (hereinbelow, termed "RAMs"); numeral 15 an edge detector; numeral 16 a latch register; symbols 17C, 17B and 17F high-speed digital/analog (D/A) converters of the multiplication type; numeral 18 a low-pass filter constructed of field effect transistors (FETs); numeral 19 an amplifier; symbols 20B and 20F counters; symbols 21B and 21F rate multipliers; symbols 22B and 22F high-speed D/A converters; symbols 23C, 23B and 23F input terminals which receive as addresses of the RAMs 12–14 surface data read out from a line memory (a memory for storing edge information corresponding to one horizontal scanning line) of the edge-to-surface converter 4 in FIG. 1; numeral 24 an output terminal which delivers an output to the color monitor device 6 in FIG.

1; and symbols 25B and 25F full adders. Symbol 10B indicates a circuit for generating a brightness modulation signal, and symbol 10F a circuit for generating a control signal for the frequency charcteristic.

Figure 4:
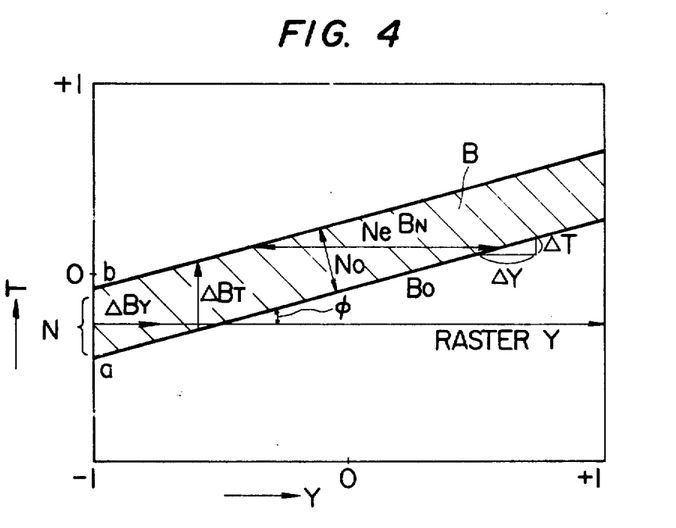
FIG. 4 is a diagram showing an example of a brightness modulation region according to this invention.

FIG. 4 illustrates the relationship among various data in the brightness modulation according to this invention, in which T indicates a vertical scanning direction and Y a horizontal scanning direction. In the figure, oblique lines B indicate a brightness modulation region, $\phi$ an angle defined between the gradient of the brightness modulation region B and a raster r, $N_o$ the width of the brightness modulation region B, $N_\phi$ the number of horizontal scanning lines passing through the brightness modulation region B, $B_o$ the initial value of the brightness modulation, $B_N$ the final value of the brightness modulation, $\Delta B_T$ the varying width of the brightness modulation per horizontal scanning line, and $\Delta B_Y$ the varying width of the brightness modulation per picture element.

The angle $\phi$ corresponds to, for example, the rolling angle of an airplane to be piloted. It is expressed with the gradient $\Delta T/\Delta Y$ of the brightness modulation region B with respect to the horizontal scanning direction, as the following equation (1):

$$\phi = \tan^{-1}(\Delta T/\Delta Y) \tag{1}$$

The number $N\phi$ of the horizontal scanning lines passing through the brightness modulation region B becomes as indicated by the following equation (2):

$$N\phi = N_o/\cos\phi \tag{2}$$

Subsequently, the varying width $\Delta B_T$ of the brightness modulation per horizontal scanning line within the region B is expressed as the following equation (3):

$$\Delta B_T = (B_N - B_o)/N\phi \tag{3}$$

Letting $N_e$ denote the number of picture elements within one raster passing through the brightness modulation region B, the varying width $\Delta B_Y$ of the brightness modulation per picture element in the region B has the relations of the following equations (4) and (5):

$$\Delta B_Y = (B_N - B_o)/N_e \tag{4}$$

$$N_e = N_o/\sin\phi \tag{5}$$

Although not illustrated in the drawing, similar relations to the foregoing are also held for a control region F for the frequency characteristic.

Figures 5A, 5G:
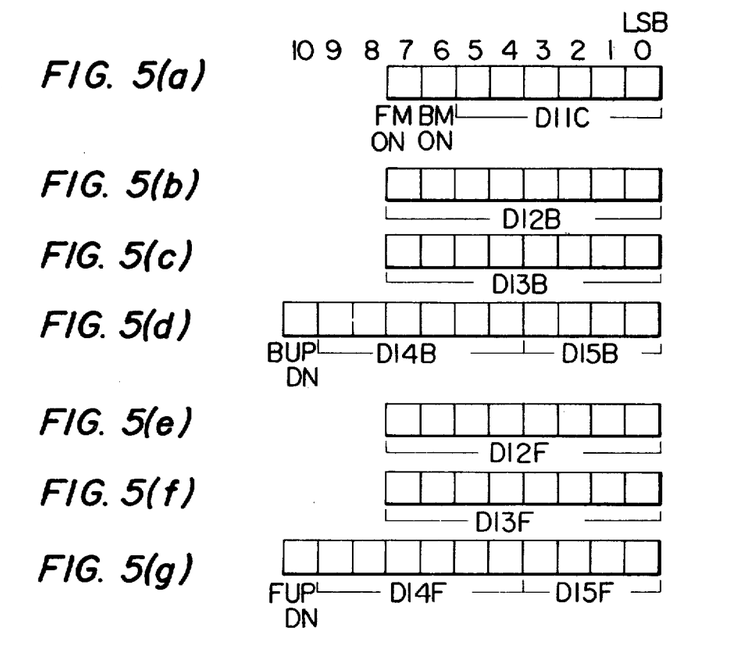

FIG. 5 shows examples of the bit constructions per word of data which are stored in the RAMs 12-14 in FIG. 3. (a) illustrates the bit construction for the RAM 12C, (b) for the RAM 12B, (c) for the RAM 13B, (d) for the RAM 14B, (e) for the RAM 12F, (f) for the RAM 13F, and (g) for the RAM 14F.

Now, the data which is stored in the respective RAMs will be described in detail.

(1) RAM 12C:

This RAM 12C stores the brightness levels of each kind of figure and the presence of the brightness modulation as well as the frequency characteristic control in the corresponding primary color, and has one word assigned to a figure having a certain kind of color. Accordingly, assuming that there is a figure having 32 kinds of colors, the RAM 12C is constructed of 32 words.

In the eight bits of each word, the least significant six bits denote data DI1C of the brightness level of the corresponding figure. The seventh bit from the least significant bit LSB contains therein a control information BMON indicating if the figure is subjected to the brightness modulation, and the eighth bit contains therein a control information FMON indicating if the frequency characteristic of the figure is controlled. Assuming by way of example that the control information BMON and FMON are "1" and that the operation lies within the brightness modulation region and the frequency characteristic control region as stated hereinafter, the corresponding figure information is subjected to brightness modulation and frequency characteristic control respectively.

(2) RAM 12B:

This RAM 12B stores the initial value $B_o$ of the brightness modulation in each brightness modulation region and has one word assigned to one brightness modulation region, one word being made up of data DI2B of eight bits. Supposing by way of example that if four brightness modulation regions can be set then the RAM 12B is constructed of four words.

The initial value $B_o$ needs to be corrected because a point a of the brightness modulation region B shown in FIG. 4 becomes below $T = -1$ in some flight postures of the piloted airplane. More specifically, letting $N_\phi'$ denote the number of rasters within the region B as included below $T = -1$ at the left end $(r=1)$ of the brightness modulation region B, the corrected value $B_o'$ becomes as given by the following equation (6):

$$B_o' = B_o + \Delta B_T N_\phi' \tag{6}$$

The content of the RAM 12B is rewritten to a result accumulated by $\Delta B_T$ every horizontal scanning line if the operation lies within the brightness modulation region at the time of initiation of the horizontal scanning.

For example, in a range of $-1 \leq T \leq a$ in FIG. 4, the content of the RAM 12B is $B_o$, and in the range of $a < T \leq b$, the result accumulated by $\Delta B_T$ every horizontal scanning line is written into the RAM 12B. At $T = b$, the content of the RAM 12B becomes as in the following equation (7):

$$B_o + \Delta B_T N_\phi = B_N \tag{7}$$

In a range of $b < T \leq 1$, the content of the RAM 12B becomes $B_N$.

(3) RAM 13B:

This RAM 13B stores the varying width $\Delta B_T$ of the brightness modulation per horizontal scanning line corresponding to each brightness modulation region and has one word assigned to one brightness modulation region, one word being made up of data DI3B of eight bits. If the brightness modulation regions are four in number as in the case of (2), the RAM 13B is constructed of four words.

As indicated in Equations (2) and (3), the varying width $\Delta B_T$ of the brightness modulation is determined by the initial value $B_o$, final value $B_N$, gradient $\phi$ and width $N_o$ of the brightness modulation region. Among these values, $\phi$ is determined in accordance with the piloted state of the airplane, and $B_o$, $B_N$ and $N_o$ are determined in advance in accordance with flight circumstances such as flight under a cloudless sky and flight in a mist.

(4) RAM 14B:

Assuming the number of brightness modulation regions to be four, this RAM 14B is constructed of four words, each of which is made up of eleven bits.

In each word, bits from the LSB to the tenth bit store therein data which represent the varying width $\Delta B_Y$ of the brightness modulation per picture element in the corresponding brightness modulation region.

The data DI4B stored in the fifth-tenth bits counted from the LSB correspond to the varying width $\Delta B_Y$ of the brightness modulation indicated by Equations (4) and (5), while the data DI5B stored in the LSB-fourth bit serves to compensate for insufficiency in the varying rate of the brightness modulation with the data DI4B. More specifically, with the data DI4B, only $\Delta B_Y = 1$ can be increased or decreased at the maximum per picture element. Therefore, when $\phi$ becomes as large as $\phi = 80°$, the actual varying width per picture element cannot be followed so that the insufficiency is compensated for with the data DI5B.

Data BUPDN in the most significant bit within each word indicates the varying direction of the varying width $\Delta B_Y$ of the brightness modulation, that is, whether the brightness modulation is in the increasing direction or the decreasing direction with respect to the horizontal scanning. For example, if the data BUPDN is "1", the brightness modulation is in the increasing direction.

The RAM 12F stores therein the initial value of the frequency characteristic in each frequency characteristic control region, while the RAM 13F stores the varying width of the frequency characteristic per horizontal scanning line in each frequency characteristic control region, and the RAM 14F stores therein the varying width of the frequency characteristic per picture element in each frequency characteristic control region.

The bit constructions of each word for the contents of these RAMs 12F, 13F and 14F are as shown in (e), (f) and (g) in FIG. 5, respectively. The details are essentially the same as those of the bit constructions of the RAMs 12B, 13B and 14B stated in the above items (2), (3) and (4) respectively, and the explanation is therefore omitted here.

The respective data above stated is written into the foregoing RAMs 12, 13 and 14 by proper write means during the vertical blanking of the color monitor device 6 in FIG. 1.

If the raster lies within the brightness modulation region or the frequency characteristic control region, the content of the RAM 12B and the varying width $\Delta B_T$ of the brightness modulation of every raster are added during the horizontal blanking of the monitor device 6, and the content of the RAM 12B is rewritten to the operated result.

Figure 6:
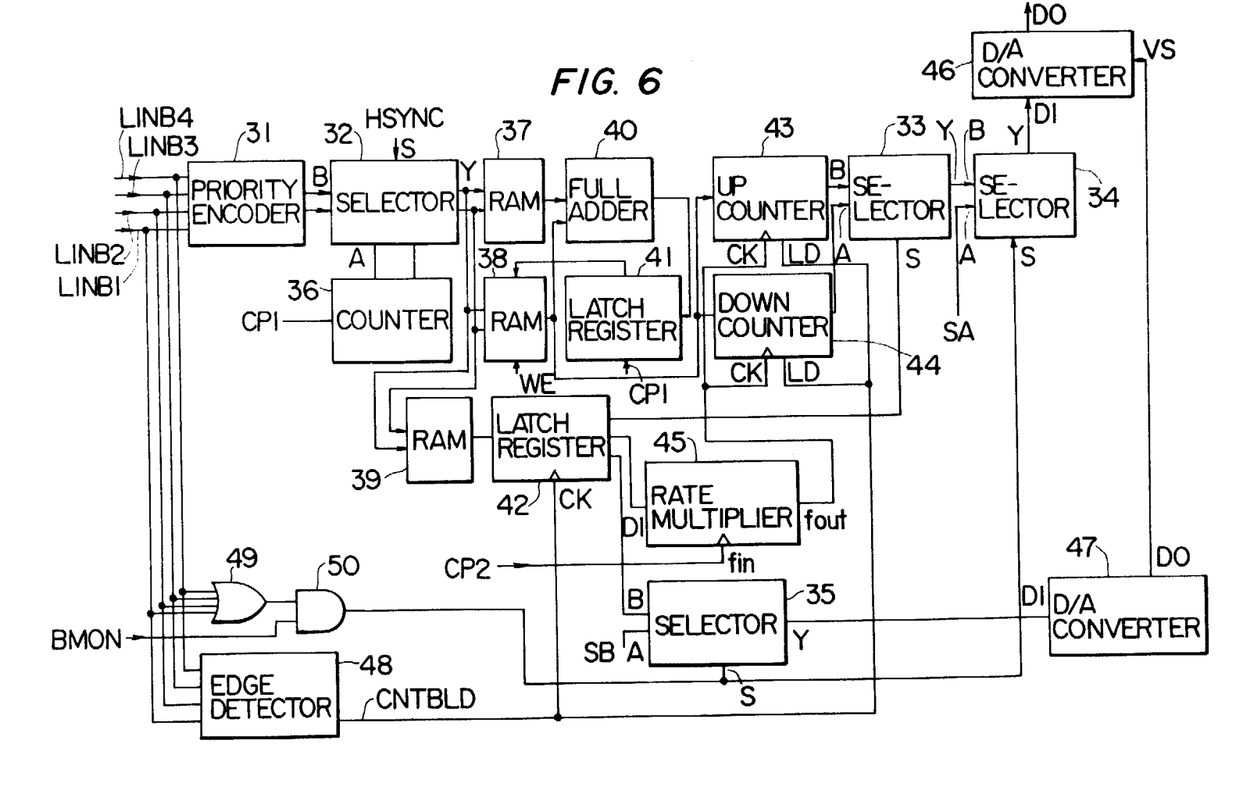
FIG. 6 is a block diagram showing an example of the detailed arrangement of a brightness modulation signal-generating circuit in FIG. 3.

FIG. 6 shows an example of a more detailed arrangement of the brightness modulation signal-generating circuit 10B in FIG. 3. Numeral 31 designates a priority encoder, numerals 32-35 selectors, numeral 36 a counter, numerals 37-39 RAMs, numeral 40 a full adder, numerals 41 and 42 latch registers, numerals 43 and 44 up- and down-counters respectively, numeral 45 a rate multiplier, numeral 46 a high-speed D/A converter of the multiplication type, numeral 47 a high-speed D/A converter, numeral 48 an edge detector, numeral 49 an OR gate, and numeral 50 an AND gate. Among these components, the priority encoder 31 corresponds to 11B in FIG. 3; the RAMs 37, 38 and 39 correspond to 13B, 12B and 14B in FIG. 3 respectively; the adder 40 corresponds to 25B in FIG. 3; the counters 43 and 44 correspond to 20B in FIG. 3; the rate multiplier 45 corresponds to 21B in FIG. 3; and the D/A converters 46 and 47 correspond to 17B and 22B in FIG. 3 respectively.

Figure 7:
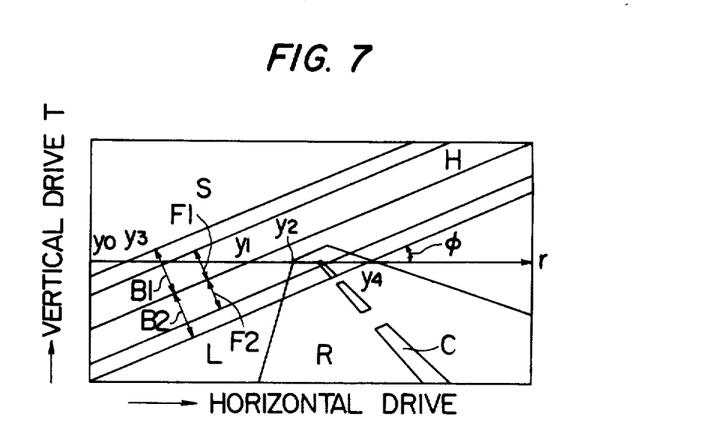
FIG. 7 is a diagram showing an example of a surface which is displayed by this invention.

FIG. 7 shows an example of the visual scene which is displayed on the monitor device in accordance with this invention. The example has two brightness modulation regions B1 and B2 and two frequency characteristic control regions F1 and F2.

Figure 8:
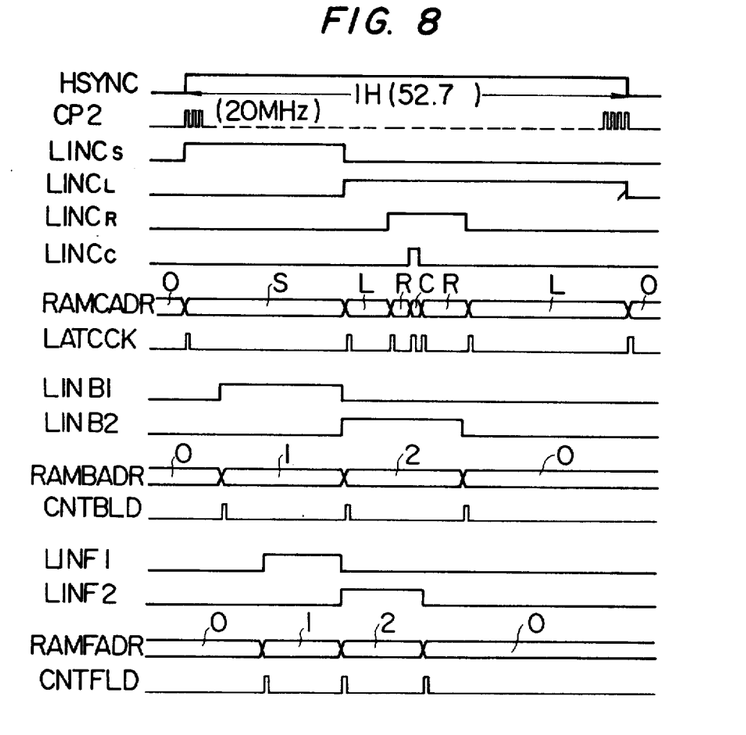
FIG. 8 is a diagram of the operation timings of various parts in FIGS. 3 and 6.

FIG. 8 shows a time chart of the operations of various parts in FIGS. 3 and 6 during the scanning of the raster r in the display of FIG. 7. HSYNC designates a horizontal scanning period; CP2 a clock of 20 MHz for the rate multiplier 45; LINC$_S$, C$_L$, C$_R$ and C$_C$ outputs from the line memory (inputs to the input terminal 23C) representing the sky, a lawn, a runway, and a center line, respectively; RAMCADR a readout address of the RAM 12C; LATCCK a clock for latch to be applied to the latch register 16 (output of the edge detector 15); LINB1 and B2 outputs of the line memory (inputs of the input terminal 23B) representing brightness modulation regions; RAMBADR a readout address of the RAM 12B; CNTBLD a set timing of the counter 20B (corresponding to the counters 43 and 44 in FIG. 6); LINF1 and F2 outputs of the line memory (inputs of the input terminal 23F) representing frequency characteristic control regions; RAMFADR a readout address of the RAM 12F; and CNTFLD a set timing of the counter 20F.

Hereafter, the operations of the circuits in FIGS. 3 and 6 will be described in detail with reference to FIGS. 7 and 8.

First of all, there will be explained a color displaying method in the case where neither the brightness modulation nor the control of the frequency characteristic are carried out (outside the brightness modulation region or BMON=0 and outside the frequency characteristic control region or FMON=0). The raster r is taken as an example in FIG. 7. The output LINC$_S$ of the line memory storing the figure range of the sky is generated at a horizontal scanning point $y = y_o$, and enters the priority encoder 11C from the input terminal 23C. Thus, the priority encoder 11C assigns the address RAMCADR of the RAM 12C, to read out the brightness level of the corresponding primary color from the RAM 12C (the output LINC$_n$ of the line memory and the content of the address n of the RAM 12C are brought into correspondence in advance). On the other hand, the edge of the output LINC$_S$ is caught by the edge detector 15, the latch register 16 having the clock LATCCK impressed thereon, and the data DI$_1$ read out from the RAM 12C is loaded into the latch register 16. This data is applied to the multiplication type D/A converter 17C and is converted into an analog voltage V$_D$. The converted voltage V$_D$ is passed through the FET low-pass filter portion 18 as well as the amplifier portion 19 and is applied to an R, G or B terminal as the brightness signal of the monitor device 6 in FIG. 1. Now, the select signal S of the selectors 34 and 35 is "0". Therefore, when the selectors select set values SA and SB in the case of executing no brightness modulation, the multiplication input voltage V$_S$ of the D/A converter 17C becomes constant, and the brightness does not vary with time. In this case, e.g. "10000000" being a binary signal is set as the set value SA and e.g. "0000" is set as the set value SB. The same applies to the control of the frequency characteristic, and the FET gate voltage V$_G$ of the low-pass filter portion 18 becomes constant so that the frequency characteristic does not vary.

Subsequently, the output $LINC_L$ of the line memory indicative of the figure of the lawn is generated at a scanning point $y_1$. When it is received from the input terminal 23C, the address RAMCADR of the RAM 12C becomes "L", and the color of the lawn is displayed through the same procedure as described above. At a scanning point $y_2$, the output $LINC_R$ of the line memory indicative of the figure of the runway is developed, and the content of the address RAMCADR of the RAM 12C is displayed. Here, $LINC_L$ is connected to a priority input terminal higher in the priority level than that of $LINC_S$, and $LINC_R$ is connected to one higher than that of $LINC_L$. Thus, even superposed figures are displayed in the order of the priority level. The same applies to the output of $LINC_C$ representative of the figure of the center line of a runway, etc.

Now, a brightness modulating method will be explained. When the signal LINB representative of the brightness modulation region B is "1" and the signal BMON is "1", the brightness of the figure gradually varies from the above-stated brightness (the content of the RAM 12C) in accordance with the contents of the RAMs 12B, 13B and 14B.

The explanation will be made along the timing of the raster r in FIG. 7.

At the scanning initiation point $y_o$ of the raster r, the ranges of the brightness modulation regions B1, B2 and the frequency characteristic control regions F1, F2 are not involved. In rasters for which the horizontal scanning-initiating points lie within the regions, the varying width $\Delta B_T$ of the RAM 37B is added to the content of the RAM 38 by means of the adder 40 during the horizontal blanking, and the content of the RAM 38 is rewritten by the use of the result. More specifically, at the same time that a clock signal CP (at, for example, 2.5 MHz), generated during the horizontal blanking begins to be counted by the counter 36, the content of the counter 36 is selected and applied as addresses to the RAMs 37 and 38 by the selector 32 with the horizontal synchronizing signal HSYNC. The contents thus read out from the RAMs 37 and 38 are added by the adder 40, and the result of such addition is stored into the latch register 41 with the clock signal $CP_1$. When a write control signal WE is applied to the RAM 38, the content of the latch register 41 is written into the RAM 38 to rewrite this RAM 38. The addition by the adder 40 is executed for every address assigned by the counter 36. However, the rewrite of the RAM 38 is actually executed at only the address corresponding to the specified brightness modulation region in which the initiation point of the present scanning line lies.

When, upon gradual variation of the brightness modulation, the initiation point of the raster has reached the boundary point of the brightness modulation region, the content of the RAM 38 becomes the final value BN of the brightness modulation. Accordingly, at the scanning initiation point $y_o$ lying outside the brightnes modulation region $B_1$, the output of the RAM 38 is the final value $BN_1$ of the brightness modulation region $B_1$. When the scanning point has reached $y_3$, it falls within the brightness modulation region $B_1$, the output $LINB_1$ of the line memory enters the priority encoder 31, and the content of the address corresponding to $LINB_1$ (for example, address 1), that is, $BN_1$ is loaded into the up- and down-counters 43 and 44 by the use of the edge signal CNTBLD detected by the edge detector 48.

Here, the counter 43 is a binary counter for count-up, while the counter 44 is a binary counter for count-down.

On the other hand, the content of the same address of the RAM 39 is loaded into the latch register 42 by the same timing signal CNTBLD. The data D15B of the first-fourth bits counted from the LSB is applied to the data input terminal B of the selector 35, the data DI4B of the fifth-tenth bits counted from the LSB is applied to the data input terminal DI of the rate multiplier 45, and the data BUPDN of the eleventh bit is applied to the selector terminal S of the selector 33. Here, if the data BMON of the seventh bit from the LSB in the output of the latch register 16 in FIG. 3 is "1", a signal is applied to the selector terminals S of the selectors 34 and 35 through the AND gate 50, and if the data BUPDN of the eleventh bit from the LSB in the output of the latch register 42 is "1", a signal "1" is applied to the selector terminal S of the selector 33, so that the selectors 33–35 select the inputs of the data input terminals B respectively.

In the rate multiplier 45, the data DI4 of the fifth-tenth bits counted from the LSB of the RAM 39 is applied to an input terminal DI thereof, and a clock $CP_2$ at, for example, 20 MHz is applied to an input terminal $f_{in}$ thereof. Also the rate multiplier 45 delivers from its output terminal $f_{out}$ a clock of a rate determined by the input data DI4B relative to the clock $CP_2$, and applies it to the counters 43 and 44. In the respective counters 43 and 44, the count-up and the count-down are executed with the output clock from the rate multiplier 45. At this time, the selectors 33 and 34 select the data of the input terminals B, that is, the output of the counter 43, so that the output is applied to the multiplication type D/A converter 46. Further, the data DI5B from the LSB to the fourth bit of the RAM 39 is applied to the D/A converter 47 through the selector 35, and the output after the analog conversion is applied to the D/A converter 46. In the D/A converter 46, the data corresponding to the multiplication value between the data applied to its data input terminal DI from the selector 34 and the data applied to its control terminal $V_S$ from the D/A converter 47 is converted into an analog signal, which is applied to the multiplication type D/A converter 17C in FIG. 3.

Accordingly, as the scanning point of the raster r moves from $y_3$ to $y_1$, the brightness level in the corresponding primary color rises, and at the scanning point $y_1$, that is, the point of intersection with the horizon H, approximately the initial value $B_{01}$ of the brightness modulation region $B_1$ is reached.

Subsequently, the output $LINB_2$ of the line memory is generated at the scanning point $y_1$, the contents of an address corresponding thereto, for example, address 2 are read out from the RAMs 38 and 39, and the brightness modulation in the brightness modulation region $B_2$ is executed in the same way as described above. Accordingly, at the scanning point $y_4$, the proportion of the modulation becomes substantially equal to the initial value $B_{02}$ of the region $B_2$, and when the scanning point $y_4$ is exceeded, the brightness is not modulated.

In the case where the raster r has entered the frequency characteristic control region $F_1$ or $F_2$, a signal for the frequency characteristic control is generated in a similar manner to the foregoing by the frequency characteristic control signal-generating circuit 10F which is constructed similarly to the brightness modulation signal-generating circuit 10B. The signal is applied to the control terminal $V_G$ of the low-pass filter 18 in FIG. 3, into which are fed the frequency characteristic of the brightness signal delivered from the D/A converter 17C.

Figure 9:
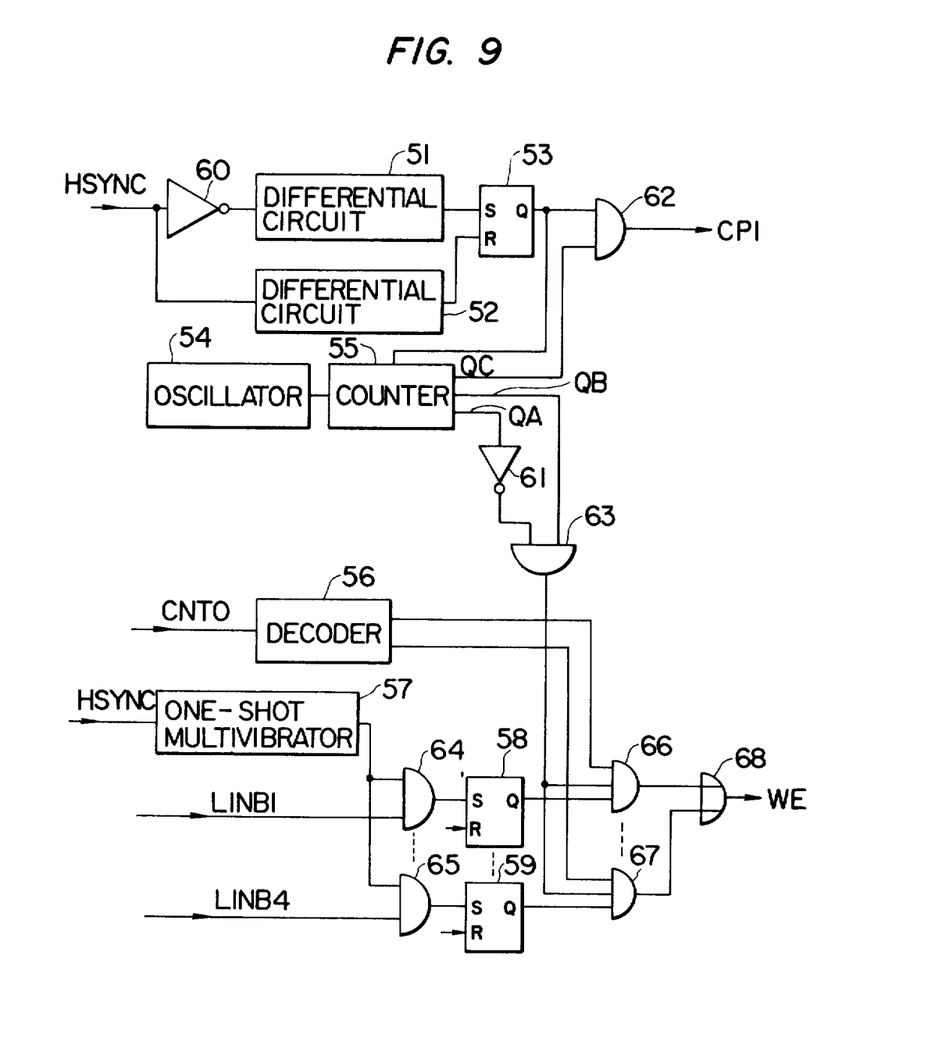
FIG. 9 is a block diagram of an example of a circuit for generating various signals for the circuit of FIG. 6.

FIG. 9 shows an example of a circuit for generating the clock signal $CP_1$ and the write control signal WE in FIG. 6. Numerals 51 and 52 designate differential circuits for differentiating the rises of signals; numeral 53 a flip-flop; numeral 54 an oscillator of 19 MHz; numeral 55 a counter; numeral 56 a decoder; numeral 57 a one-shot multivibrator; numerals 58 and 59 flip-flops; numerals 60 and 61 inverters; numerals 62-67 AND gates; and numeral 68 an OR gate.

Figures 10A, 10F:
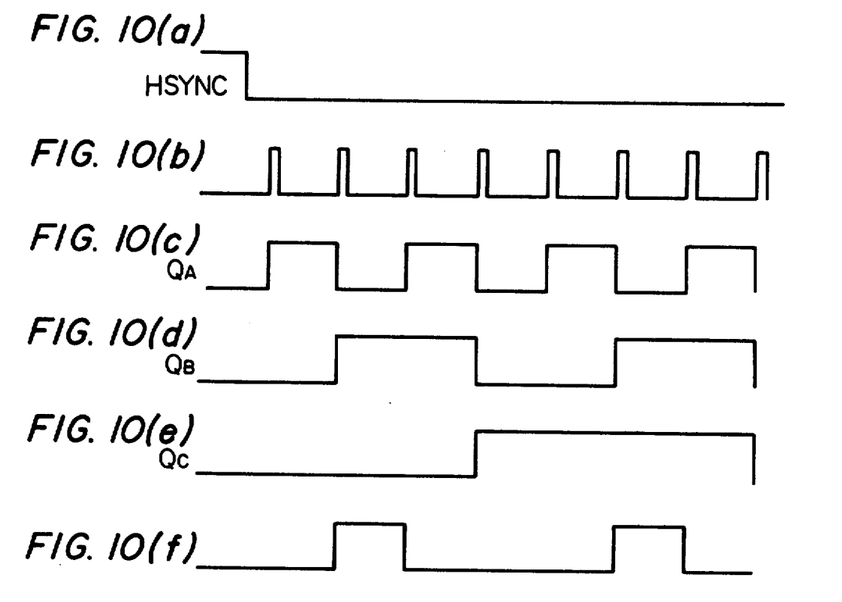

FIG. 10 shows signal waveforms at various locations in FIG. 9. (a) illustrates the horizontal synchronizing signal HSYNC, (b) an output from the oscillator 54, (c)-(e) outputs $Q_A$-$Q_C$ from the counter 55, and (f) an output from the AND gate 63.

The operation of the circuit in FIG. 9 will be explained with reference to FIG. 10.

When the horizontal scanning period has begun and the horizontal synchronizing signal HSYNC has risen, pulses of a predetermined width are provided from the one-shot multivibrator 57. If there is an output $LINB_1$-$LINB_4$ of the line memory at this time, the corresponding AND gate 64 or 65 is enabled, and the corresponding flip-flop 58 or 59 is set. For example, upon generation of the output $LINB_1$, the flip-flop 58 is set, and its Q terminal becomes "1".

When, upon completion of the horizontal scanning under such state, the horizontal blanking period has begun and the horizontal synchronizing signal HSYNC has fallen as shown at (a) in FIG. 10, the flip-flop 53 is set by the inverter 60 and the differential circuit 51. Simultaneously, the clock pulses from the oscillator 54 as shown at (b) in FIG. 10 are counted by the counter 55, to obtain the outputs $Q_A$, $Q_B$ and $Q_C$ of the respective stages of the counter 55 as shown at (c), (d) and (e) in FIG. 10.

The AND gate 62 takes the logical product of the set output of the flip-flop 53 and the output $Q_C$ of the counter 55, and the resultant output is used as the clock $CP_1$. The logical product between the output $Q_B$ of the counter 55 and an output with the output $Q_A$ inverted by the inverter 61 is taken by the AND gate 63, and the output as shown at (f) in FIG. 10 is applied to the AND gates 66 and 67.

On the other hand, as stated above, the address signal $CNT_0$ generated from the counter 36 shown in FIG. 6 is applied to the decoder 56, and an output is provided from a signal line corresponding to the address signal and is applied to the corresponding AND gate 66 or 67. If, at that time, the corresponding flip-flop 58 or 59 is set, in other words, the raster lies within the corresponding brightness modulation region, then the write control signal is produced through the AND gate 66 or 67 and the OR gate 68. When the horizontal blanking period has lapsed and the horizontal synchronizing signal has risen again, the flip-flop 53 is reset by the differential circuit 52 to suspend the generation of the clock $CP_1$ and also reset the counter 55. Simultaneously therewith, the flip-flops 58 and 59 are reset. Although not illustrated in the drawing, the output of the differential circuit 52 may be employed as the reset signals of the flip-flops 58 and 59.

Figure 11:
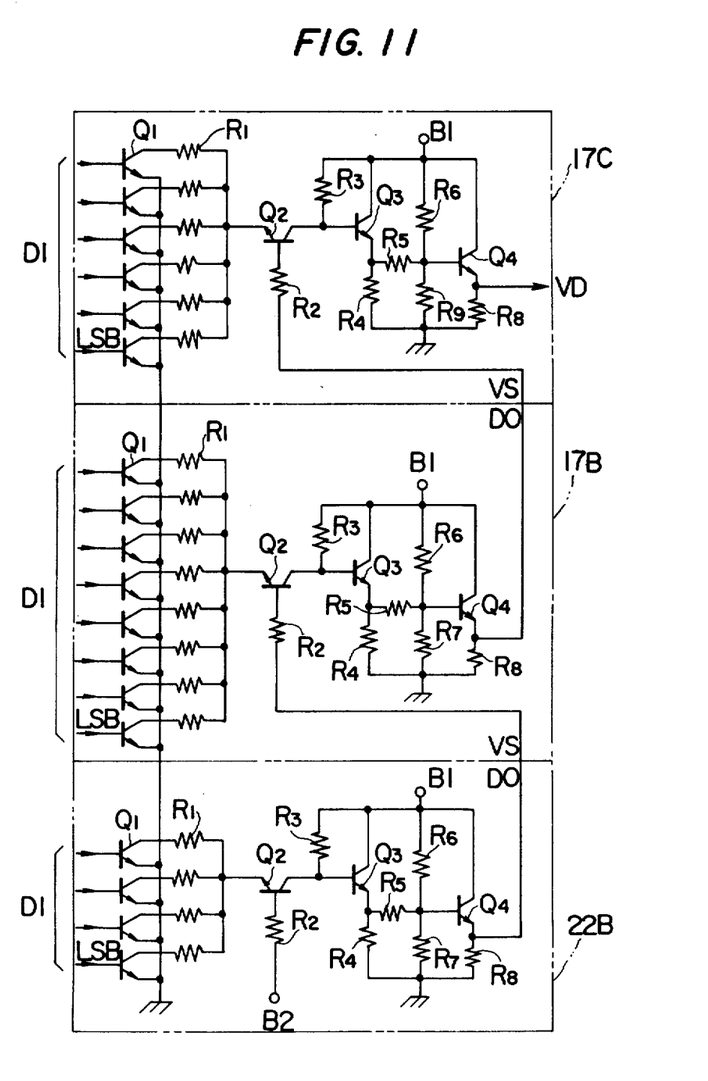
FIG. 11 is a connection diagram showing an example of the detailed arrangement of the D/A converters in FIG. 3.

FIG. 11 shows an example of the detail of the D/A converters 17C, 17B and 22B shown in FIGS. 3 and 6 (corresponding to 46 and 47 in FIG. 6). In each of the D/A converters, $Q_1$-$Q_4$ indicate transistors, $R_1$-$R_8$ resistances, and $B_1$ a power supply terminal of a positive voltage (for example, +5 V). In these circuits, the transistor $Q_1$ and the resistance $R_1$ serve to convert an input data DI into an analog voltage, the transistor $Q_2$ and the resistance $R_2$ serve to multiply this analog voltage and a voltage applied to the base of the transistor, and the transistors $Q_3$, $Q_4$ and the resistances $R_3$-$R_8$ serve as level shifts. A fixed voltage of, for example, +5 V is applied from a power supply terminal $B_2$ to the base of the transistor $Q_2$ of the D/A converter 22B, the output $V_S$ of the D/A converter 46 is applied to the base of the transistor $Q_2$ of the D/A converter 17.

Figure 12:
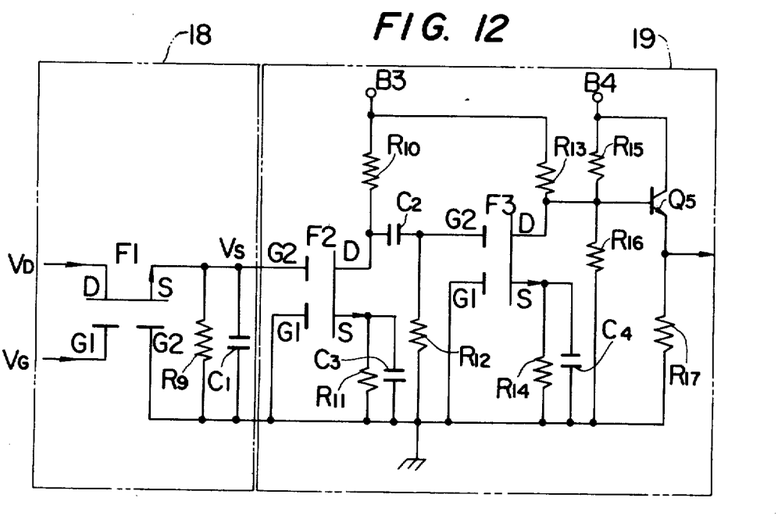
FIG. 12 is a connection diagram showing an example of the detailed arrangement of a filter portion and an amplifier portion in FIG. 3.

FIG. 12 shows an example of the detailed arrangement of the low-pass filter portion 18 and the amplifier 19 in FIG. 3. $F_1$-$F_3$ designate FETs each being provided with gates $G_1$ and $G_2$, a drain D and a source S; $Q_5$ a transistor; $R_9$-$R_{17}$ resistances; and $B_3$ and $B_4$ power supply terminals. A voltage of, for example, +5 V is applied to the power supply terminal $B_3$, while a voltage of, for example, +15 V is applied to $B_4$.

Among them, the FET $F_1$ of the low-pass filter portion 18 serves to control the frequency characteristic of an output $V_D$ from the D/A converter 17C in FIG. 3 by the use of an output $V_G$ from the D/A converter 17F.

The D/A converters 17F and 22F in FIG. 3 have the same constructions as those of the D/A converters 17B and 22B shown in FIG. 11, respectively, except that the voltage to be applied to the power supply terminal $B_1$ of the D/A converter 17B is different (for example, -5 V) and that the transistor $Q_4$ changes from the npn-type to the pnp-type.

Although the control circuit for writing data into the RAMs 12-14 during the vertical blanking is not specifically illustrated, a conventional control circuit for the write-in of memories can be used.

The construction in FIG. 3 is the circuit arrangement for one primary color, and circuits of the same construction as in FIG. 3 are disposed for the respective three primary colors. In this case, the priority encoders 11C, 11B and 11F and the edge detector 15 can be used in common for the three primary colors.

As stated above, the circuits in FIG. 3 are juxtaposed for the three primary colors, whereby not only the brightness but also the color can be gradually varied. Therefore, by making the final value $B_N$ of the brightness modulation region of red great by way of example, the color turns reddish from blue as the horizon comes closer, and hence, the appearance of the sky aglow with the setting sun, etc. is permitted.

Either or both of the brightness modulation signal-generating circuit 10B and the frequency characteristic control signal-generating circuit 10F in FIG. 3 may well be disposed in common for the three primary colors.

Further, by varying the final values $B_N$ and $F_N$ and the region width $N_O$ of the brightness modulation region and the frequency characteristic control region, visual scenes according to various flight environments and visibilities as listed below can be generated:

(a) a visual scene in which the vicinity of the horizon in a cloudless sky is blurred;
(b) a visual scene in a mist;
(c) a visual scene of a target on the ground surface illuminated by the landing lamps of an airplane in the nighttime;
(d) a visual scene of twilight.

Further, especially by the control of the frequency characteristic, the unnaturalness of a picture (step effect, face breakup, face crawling, face blinking, etc.) attributed to inconsistent resolutions can be eliminated.

Although the foregoing embodiments have been described as to the cases where the number of the memory words of the RAMs 12-13, the number of bits of each word, the number of the brightness modulation regions as well as the frequency characteristic control regions, etc. are specific numbers, it is a matter of course that the invention is not restricted thereto.

Although the foregoing embodiments have been described as to the generation of simulated visual scenes in the case of the piloting of an airplane, this invention is not restricted thereto but is applicable to various uses.

As set forth above, in accordance with this invention, the modulation of the brightness level of an image and the control of the frequency characteristic thereof are carried out, thereby making is possible to blur a visual scene and to realize a visual scene according to the natural environment and the visibility, so that a real picture can be generated and displayed.

We claim:

1. A figure displaying device comprising display means for displaying information of a figure, first generation means for generating a brightness signal which corresponds to the figure information to be displayed, second generation means for generating a brightness modulation signal which varies continuously in at least one direction within a predetermined first region on a display screen of said display means, third generation means for generating a frequency characteristic control signal which varies continuously in at least one direction within a predetermined second region on said display screen which is in overlapping relationship with at least a portion of said first region, modulation and control means connected to said first, second and third generation means for brightness-modulating the brightness signal from said first generation means in accordance with the signal from said second generation means and for controlling a frequency characteristic of the brightness signal from said first generation means in accordance with the signal from said third generation means to selectively vary the composition of frequency components in the brightness signal and thereby affect the resolution of the displayed image, and means for applying the modulated and controlled brightness signal from said modulation and control means to said display means.

2. A figure displaying device as defined in claim 1, wherein said first generation means comprises memory means for storing the brightness signals which correspond to the figure information, and readout means connected to said memory means for reading out from said memory means said brightness signal which corresponds to said figure information to be displayed.

3. A figure displaying device as claimed in claim 1 or claim 2, wherein said second generation means comprises first and second memory means for storing the variation of the brightness modulation in vertical and horizontal directions on said display screen, respectively, third memory means for storing an initial value of the brightness modulation, and means connected to said first to third memory means for generating a brightness modulation signal which varies continuously in dependence on the contents of said first to third memory means within the first region.

4. A figure displaying device as defined in claim 1 or claim 2, wherein said third generation means comprises first and second memory means for storing the variation of the frequency characteristic in vertical and horizontal directions on said display screen, respectively, third memory means for storing an intial value of the frequency characteristic, and means connected to said first to third memory means for generating a frequency characteristic signal which varies continuously in dependence on the contents of said first to third memory means within the second region.

* * * * *